United States Patent [19]

Lynn

[11] Patent Number: 4,726,564
[45] Date of Patent: Feb. 23, 1988

[54] PULL-LINE CANNISTER

[76] Inventor: Randy R. Lynn, 4087 Pipestone, Benton Harbor, Mich. 49022

[21] Appl. No.: 907,331

[22] Filed: Sep. 15, 1986

[51] Int. Cl.⁴ .............................................. E21C 29/16
[52] U.S. Cl. .................................................. 254/134.4
[58] Field of Search ............... 254/134.3 R, 134.3 FT, 254/134.4; 226/97; 15/104.06

[56] References Cited

U.S. PATENT DOCUMENTS

| | | | |
|---|---|---|---|
| 2,930,584 | 3/1960 | Hensley et al. | 254/134.3 R |
| 3,244,402 | 4/1966 | Ensley | 254/134.3 R |
| 3,689,031 | 9/1972 | Ruddick et al. | 254/134.4 |
| 3,837,624 | 9/1974 | Dundvrand | 254/134.4 |
| 3,927,866 | 12/1975 | Linquist | 254/134.4 |

FOREIGN PATENT DOCUMENTS 46813  3/1911  Austria ............................. 254/134.4

Primary Examiner—Robert C. Watson
Attorney, Agent, or Firm—Lackenbach, Siegel, Marzullo & Aronson

[57] ABSTRACT

The pull-line cannister includes a first housing and second housing threadably engaged with a line retainer member clamped therebetween to retain a spool of pull-line in the first housing and having a line drag cross-bar against which the line is dispensed.

9 Claims, 6 Drawing Figures

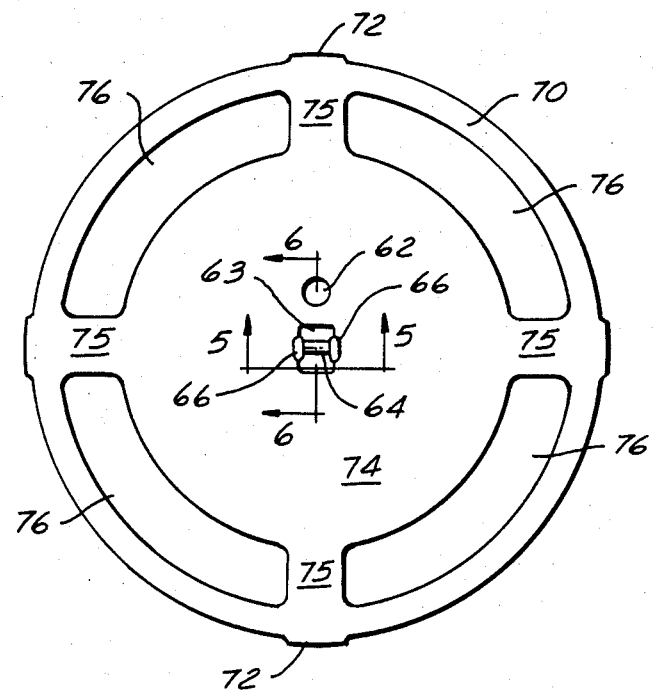

PULL-LINE CANNISTER

FIELD OF THE INVENTION

The invention relates to a line dispensing cannister for installing a pull-line into conduit when attached to a source of pressurized fluid, such as air.

BACKGROUND OF THE INVENTION

The Ensley U.S. Pat. No. 3,244,402 describes an apparatus for blowing a pull-line into conduit for subsequent use in pulling cable therethrough. The Ensley apparatus includes a hand-held line cannister connected at its rear end to the output of a blower and at its forward end to the conduit. A spool of pull-line is enclosed within the hand-held cannister. A so-called "mouse" or line carrier is connected to an end of the line within the conduit. Pressurized air from the blower is directed through the cannister and conduit against the mouse to force the mouse through the conduit, carrying the pull-line with it.

Ensley places the line spool inside the cannister to reduce air pressure losses in the system needed to blow the mouse through the conduit.

The Dandurand U.S. Pat. No. 3,837,624 discloses a similar type of pull-line blowing apparatus wherein the line spool and air blower are disposed in the same housing.

A commercially available product sold under the trademark "Blo-rope" also uses a hand-held line cannister from which pull-line is dispensed as the mouse is forced through the conduit by air pressure from a blower connected to the rear of the cannister.

SUMMARY OF THE INVENTION

The invention contemplates a pull-line dispensing cannister for use in blowing a pull-line through a conduit using a pressurized fluid from a source connected to the cannister.

In a typical working embodiment of the invention, the cannister includes a first housing having a chamber to receive a spool of pull-line, a second housing threadably engaged on the first housing and defining a discharge throat through which pull-line is dispensed into a conduit and sealable against the conduit by use of a seal member on the portion defining the throat and an intermediate line retainer member clamped in position between the first and second housings when they are threadably engaged in substantial fluid tight relation. The line retainer member serves several functions; i.e., in clamped position it substantially closes off the end of the chamber in which the line spool is received to retain the line spool therein and includes a line drag cross-bar against which the pull-line dispenses to minimize the amount of line blown into the conduit after the line carrier to which the line is attached exits the other end of the conduit.

BRIEF DESCRIPTION OF THE DRAWINGS

FIG. 3 is a side elevation of the line retainer member.

FIG. 4 is a front elevation of the line ratainer member.

FIG. 5 is an enlarged view along line 5—5 of FIG. 4.

FIG. 6 is an enlarged view along line 6—6 of FIG. 4.

BEST MODE OF CARRYING OUT THE INVENTION

Figure 1:
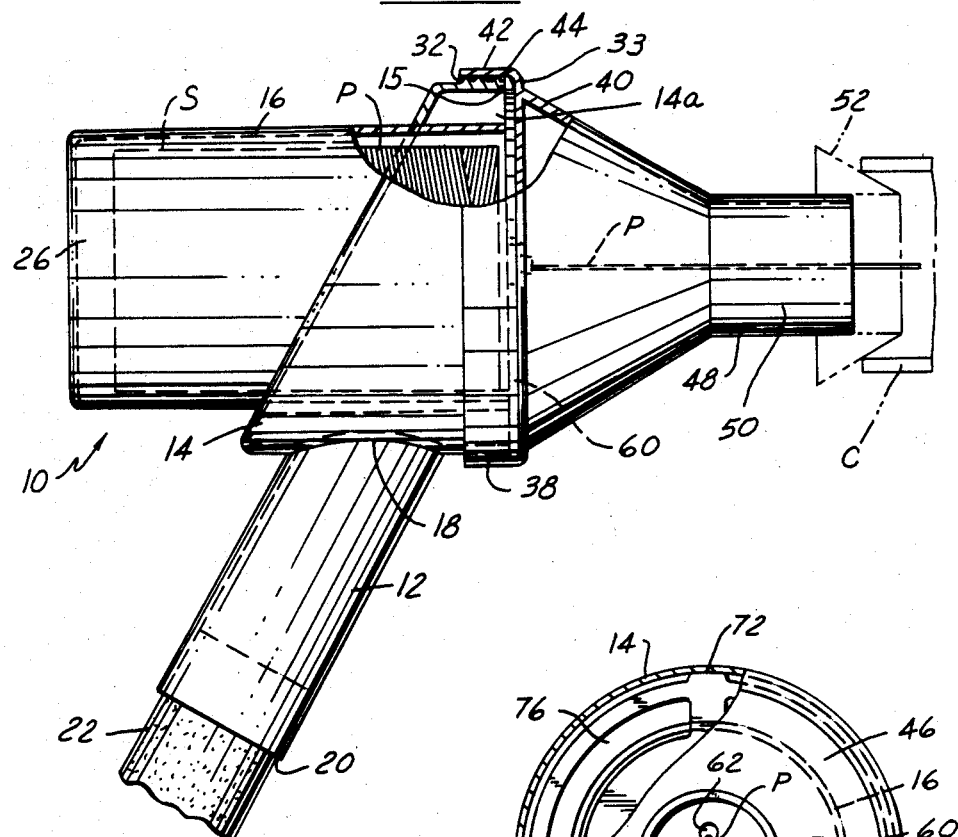
FIG. 1 is side elevation of the cannister of the invention.
Figure 2:
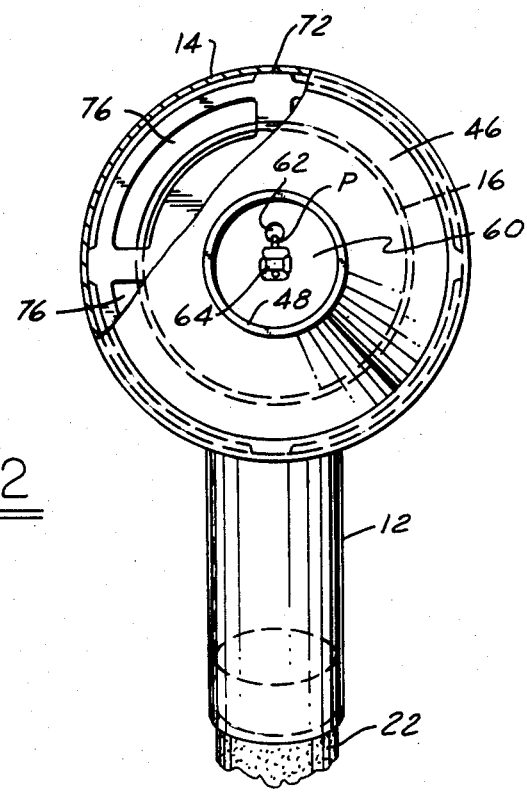
FIG. 2 is a front elevation thereof.

The figures show the hand-held cannister of the invention as including a first housing 10 having a handle portion 12, plenum portion 14 and chamber-forming portion 16. The handle portion is a hollow cylindrical tube in air flow communication with plenum portion 14 at end 18. The other open end 20 of the handle portion receives a flexible or other air conduit 22 from a conventional electrical blower (not shown).

The chamber-forming portion 16 is in the form of a hollow cylinder defining cylindrical chamber 26 to receive spool S of pull-line P therein. As shown, the cylinder of chamber-forming portion 16 extends inside the plenum portion 14 but does not communicate in air flow relation with the chamber of the plenum portion which has an annular open downstream end 14a to discharge air.

The forward end (to the right as seen in FIG. 1) of the plenum portion includes a cylindrical portion provided with molded threaded section 32. Threadably engaged in substantial air tight relation on that section 32 is a threaded section 38 of second housing 40. In particular, an annular lip 42 on second housing 40 includes threads 44 on the interior thereof. Forward of the lip 42 is a frusto conical nose portion 46 which terminates in a cylindrical tubular end 48 defining a cylindrical discharge throat on bore 50 through which the line is dispensed into a conduit. The end 48 is adapted to carry a conical or other seal member 52 or flexible air conduit including a similar seal member to sealingly engage an electrical conduit during pull-line installation.

When assembled, the chamber forming portion 16, cylindrical portion of plenum portion 14, nose portion 46 and discharge end 48 of the first and second housings having substantially coaxial longitudinal axes.

Clamped between first and second housings 10, 40 and substantially closing off the forward end of line spool chamber 26 so as to retain the line spool therein is a line-retainer plate or member 60 having an aperture 62 through which pull-line exits the chamber 26 from the center of the line spool. The line-retainer plate also includes a molded line-drag cross-bar 64 supported by lugs 66 and around which the pull-line is looped on its way through nose portion 46 and end 48 into the conduit. By virtue of looping under the line-retainer cross-bar 64 as shown, the cross-bar 64 functions to place drag on the line and minimize the amount of line blown into the conduit after the line carrier (not shown) to which the line is attached exits the end of the electrical conduit opposite from the cannister.

As shown best in FIG. 4, line retainer plate 60 includes annular rim 70 with equally spaced centering tabs 72. Rim 70 is clamped between the first and second housings as shown; in particular, between annular end surface 15 of the first housing and annular shoulder 33 of the second housing which is between annular lip 42 and nose portion 46. The line retainer plate 60 includes central circular disc-like portion 74 which has an outer diameter to close off line spool chamber 26 except for aperture 62 and aperture 63 behind the cross-bar which latter aperture results from the plastic molding operation. The disc-like portion is connected to rim 70 by webs 75 between arcuate apertures or slots 76. Slots 76 overlie the open annular end of plenum chamber 14 when plate 60 is clamped to allow air flow to nose portion 46.

It is apparent that the plane of the line retainer plate is substantially orthogonal to the longitudinal axes of chamber 26, nose portion 46 and discharge end 48.

The first housing, second housing and intermediate line retainer member can all be molded of transparent plastic.

In operation, air blown through the handle portion 12 enters plenum portion 14 around the chamber forming portion 16 and is directed through frusto-conical nose portion 46 and end 48 into the electrical conduit for blowing the line carrier therein with pull-line attached through the electrical conduit. The pull-line is dispensed from the center of the line spool in chamber 26 through aperture 62 of the line-retainer plate 60 under line-drag cross-bar 64 and out discharge end 48 through the electrical conduit.

Handle portion 12 provides a handle by which the cannister can be held sealed against the electrical conduit for pull-line dispensing.

While certain preferred embodiments of the invention have been described in detail above, those familiar with this art will recognize that various modifications can be made therein for practicing the invention as defined by the following claims:

We claim

1. A pull-line cannister comprising a first housing having a line spool receiving chamber, a second housing connected to the first housing and having a line discharge end, a line retainer member claimped between the first housing and second housing for retaining member having an aperture through which pull-line is dispensed form the spool in said chamber to the discharge end, and means for imposing drag on said pull-line as it is dispensed.

2. A pull-line cannister comprising a first housing connected to the first housing and having a line discharge end, a line retainer member clamped between the first housing and second housing for retaining the line spool in said chamber, said line retainer member having an aperture through which pull-line is dispensed from the spool in said chamber to the discharge end, and means for imposing drag on said pull-line as it is dispensed, said means for imposing drag includes a cross-bar against which the pull-line is dispensed.

3. The cannister of claim 1 wherein the first housing includes a plenum portion around a portion thereof forming said chamber.

4. The cannister of claim 3 wherein the first housing also includes a hollow handle portion in fluid flow relation to the plenum portion for directing fluid thereto.

5. The cannister of claim 1 wherein the first and second housings are threadably engaged together.

6. The cannister of claim 1 wherein the line retainer member includes an annular rim trapped between the first and second housings when they are connected.

7. The cannister of claim 6 wherein the line retainer member includes centering tabs spaced around the circumference of the rim.

8. The cannister of claim 1 wherein the first housing includes said line spool receiving chamber with a plenum chamber extending therearound receiving fluid flow.

9. The cannister of claim 8 wherein the line retainer member includes a central portion substantially closing off the line spool receiving chamber for spool retention purposes and aperture means on the periphery of the central portion and overlying an open end of the plenum chamber to allow fluid flow therefrom to the second housing.

* * * * *